United States Patent [19]

Lass

[11] 4,214,667

[45] Jul. 29, 1980

[54] SCREW MOUNTING MECHANISM FOR ELECTRICAL OUTLET BOX

[75] Inventor: John L. Lass, Homewood, Ill.

[73] Assignee: Square D Company, Palatine, Ill.

[21] Appl. No.: 68,314

[22] Filed: Aug. 20, 1979

[51] Int. Cl.[2] .......................... F16B 39/00; H02G 3/08

[52] U.S. Cl. .......................................... 220/3.2; 85/36; 151/41.76; 174/53; 220/3.5; 403/376

[58] Field of Search .................... 220/3.2, 3.3, 3.6, 3.5, 220/3.92, 3.94; 174/53, 58; 85/32 R, 36; 151/41.7, 41.76, 8; 403/376

[56] References Cited

U.S. PATENT DOCUMENTS

| | | | |
|---|---|---|---|
| 2,259,217 | 10/1941 | Stevenson | 151/8 X |
| 2,338,754 | 1/1944 | Bonas | 85/36 X |
| 2,378,684 | 6/1945 | Carlstrom | 85/36 |
| 2,759,621 | 8/1956 | Hamilton et al. | 174/58 X |
| 2,891,755 | 6/1959 | Clark | 174/58 X |
| 3,468,448 | 9/1969 | McHollan et al. | 220/3.6 |
| 3,476,343 | 11/1969 | Burrell | 174/58 X |
| 3,955,463 | 5/1976 | Hoehn | 174/53 X |
| 4,083,314 | 4/1978 | Garvin | 174/53 X |
| 4,109,693 | 8/1978 | Paskert | 85/36 X |
| 4,163,501 | 8/1979 | Lass | 220/3.6 |

*Primary Examiner*—Allan N. Shoap

*Attorney, Agent, or Firm*—John R. Garrett; Carmen B. Patti; Richard T. Guttman

[57] ABSTRACT

A retaining clip for retaining a threaded screw on a wall of an outlet box has a pair of legs extending generally parallel from a bite portion and which are received in slots in the wall extending across an elongated screw receiving passage. Each leg has an opening having a diameter substantially equal to the major diameter of the thread and each opening has a projection having an inner arcuate edge having a radius of about one-half the minor or root diameter. At least one of the openings has its center axially offset from the axis of the passage so that a line through the two centers is inclined with respect to the axis of the passage.

22 Claims, 6 Drawing Figures

SCREW MOUNTING MECHANISM FOR ELECTRICAL OUTLET BOX

DESCRIPTION

1. Technical Field of Invention

The present invention generally relates to outlet boxes adapted to receive electrical components secured therein by threaded fasteners and more particularly to an improved type of screw mounting means on the outlet box.

2. Background of the Invention

For many years electrical mounting boxes have had switches or plugs supported within the box by means of screws which are threaded into openings provided in ears or bosses of the wiring boxes. Usually the ears or bosses have internally threaded openings and considerable time is required to completely thread a pair of screws into the ears or bosses. Numerous proposals have been made to eliminate the internal threaded openings thereby reducing the time required for mounting an electrical component. Examples of such devices are disclosed in the following U.S. Pat. Nos. 4,012,580; 3,955,463; 3,895,732; 3,876,821; 3,575,313; and 3,526,703.

Virtually all these types of screw connecting means consist of some type of metallic member that has barbs or tines projecting from a surface thereof of which are designed to physically cut into a surface of a non-metallic outlet box and therefore are not practical for use with brittle plastic outlet boxes or with metal outlet boxes.

SUMMARY OF THE INVENTION

In accordance with the present invention, an outlet box has a plurality of walls that define a receptacle space with at least one wall having mounting means for supporting a screw having a perpherial thread. The mounting means includes a generally U-shaped clip that has a pair of generally parallel legs extending from a bite portion and the associated wall has an elongated passage for receiving these screws and a pair of axially spaced slots extending transversely across the passage. The pair of legs of the U-shaped clip are respectively received into slots and each leg has an opening that is substantially equal to the major diameter of the thread with one of the openings having its center axially offset from the axis of the elongated passage. Each leg also has a flexible projection extending from the periphery of the opening towards the center and the projections are adapted to engage inclined surfaces of the thread to retain the screw in the passage.

Each projection has a generally arcuate free edge with the arcuate edge having a radius which is equal to one-half the root diameter for the thread and each projection having an inclined surface extending from the edge towards the periphery of the opening to produce a camming surface for the threaded screw. The U-shaped clip has a pair of inclined ramps in each leg thereof with the edge of the ramps each having a ledge that extends generally parallel to the axis of the passage so that the U-shaped clip is retained on the wall by having the bite portion engage one surface of the wall and the edges engage an opposite surface of the wall. Each leg of the clip also has a pair of cut-outs extending from the periphery of the opening on opposite ends of such projection to increase the flexibility of the projection.

In the illustrated embodiment, the elongated passage in the wall of the outlet box is defined by an arcuate recess which extends from one surface thereof which is generally semi-circular in cross section to define the passage while the wall has an integral embossment adjacent the free edge thereof with the embossment having an aperture for guiding the screw towards the opening in the retaining clip.

With the retaining clip located within the slots in the wall of the outlet box, an axis through the centers of the two openings in the legs defines a small acute angle with respect to the axis of the passage and the inclined surfaces on the projections are directed towards the embossment having the aperture. A threaded screw can then be axially inserted through the aperture and the respective openings by exerting some pressure on the end thereof and the inclined surfaces on the projections will slide along the thread of the screw until the screw bottoms on the exposed surface of the embossment.

If desired, each screw may then be subjected to additional torque using a conventional screw driver which will cause the gap between the two edges of the respective projections to decrease which will have a tendency of the axis through the centers of the two openings to become more generally aligned with the axis for the screw receiving passage. During such turning of the screw, the respective projections will tend to be received into the base of the thread so that any tendency of a longitudinal withdrawal force on the screw will cause the edges of the projections to jam against the screw thread root and prevent withdrawal.

DETAILED DESCRIPTION

Figure 1:
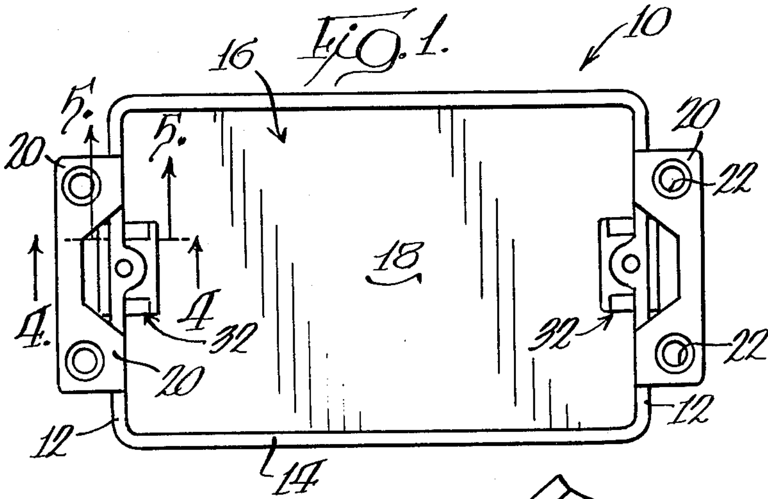
FIG. 1 is a plan view of an outlet box having the present invention incorporated into end walls thereof.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows an outlet box which is preferably a molded synthetic box that has a pair of end walls 12 and a pair of sidewalls 14 defining an open space 6 which is closed by a bottom wall 18. Each end wall 12 also has an outwardly directed mounting leg 20 integral with the upper free edge thereof with each mounting leg 20 having a pair of openings 22 so that the receptacle or outlet box 10 may be mounted in a wall of a building.

According to the present invention, each end wall 12 has mounting means 30 for supporting a threaded screw thereon. As most clearly illustrated in FIG. 2, mounting means 30 consists of a retaining means or clip 32.

Clip 32 is generally U-shaped in cross section and has a bit portion 34 and a pair of legs 36 that extend generally parallel to each other and are integral with opposite edges of bit portion 34.

Figure 3:
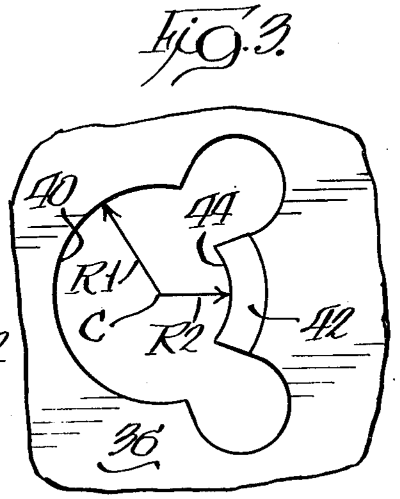
FIG. 3 is an enlarged fragmentary plan view of the opening located in one leg of the generally U-shaped retaining clip.

Each leg 36 has a generally circular opening 40 therein (FIG. 3) and opening 40 has a projection 42 integral with the periphery thereof and extending towards the center C of the opening and toward bite portion 34. The inner edge 44 of projection 42 is generally arcuate and has a radius R2 while the larger opening 40 has a radius R1. According to one aspect of the invention, the radius R1 is equal to one-half the major diameter of the thread of a threaded screw or fastener that is adapted to be received therein while the radius R2 is equal to one-half the root thread diameter of the screw thread. Also, the center C of the upper opening 40 in upper leg 36 is spaced a slightly greater distance from an inner surface 46 of bite portion 34 than the center C of the opening in the lower leg as viewed in FIG. 4. Thus, a line L through the center of the two openings define a small acute angle with respect to surface 46, for a purpose that will be described later. Each projection 44 also has an inclined camming surface 48 extending from edge 44 towards an upper surface of each leg 36.

Figure 2:
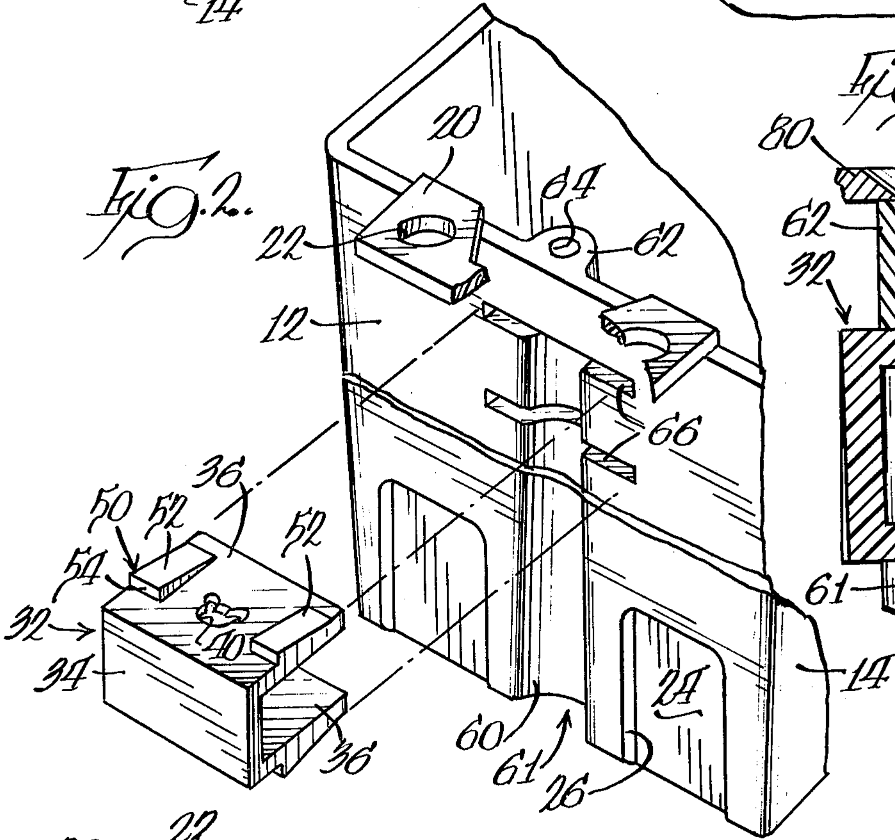
FIG. 2 is an exploded fragmentary view of one end wall and the retaining clip that forms part of the present invention.
Figure 5:
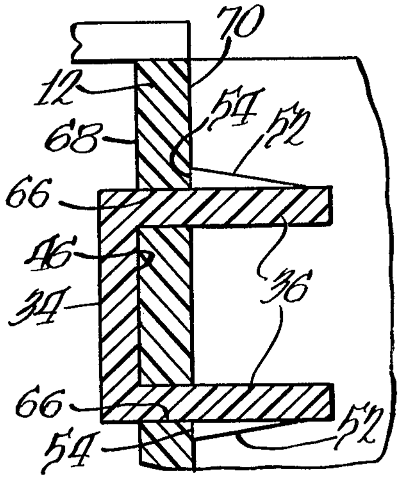
FIG. 5 is a further enlarged sectional view as viewed generally along line 5—5 of FIG. 1.

Each leg also has integral locking means for releasably retaining the U-shaped clip 32 on an associated wall 12. As illustrated in FIGS. 2 and 5, the locking means consists of an integral triangular member 50 on each side of opening 40 with each member 50 having an inclined camming surface or ramp 52 extending from the surface of leg 36 and terminating in a vertical ledge 54 that is parallel to and spaced a predetermined dimension from the inner surface of bite portion 34.

Turning now to respective end walls 12, each end wall 12 has a generally arcuate recess 60 extending from an outer surface thereof with the recess being substantially semi-circular and defining an elongated screw receiving passage 61. End wall 12 also has an embossment 62 generally aligned with the upper end of elongated passage 61 and embossment 62 has a central aperture 64. The aperture 64 has a diameter which is approximately equal to the major diameter of the thread of the screw that is received therethrough and has its center coincident with an axis defining the center of passage 60.

Each end wall 12 also has a pair of transverse slots 66 which extend across the passage 60, the slots are axially spaced from each other with the upper slot 66 being located in close proximity to the lower end of integral embossment 62.

In assembling the components, the respective legs 36 of clip 32 are inserted into slots 66 and are forced therein until ledges 54 are located adjacent the opposite surface of end wall 12. In the assembled condition, the inner surface 46 of bite portion 34 engages an outer surface 68 of wall 12 while ledges 54 engage an inner surface 70 of wall 12 as clearly illustrated in FIG. 5. Thus, the U-shaped retaining clip is fixedly secured to wall 12 with the openings 40 in the respective legs generally aligned with axial passage 60. However, since opening 40 in the upper leg 36, the line L extending through the two centers is angularly related to the axis for axial passage 60. This angle is preferably on the order of 3 degrees.

Figure 4:
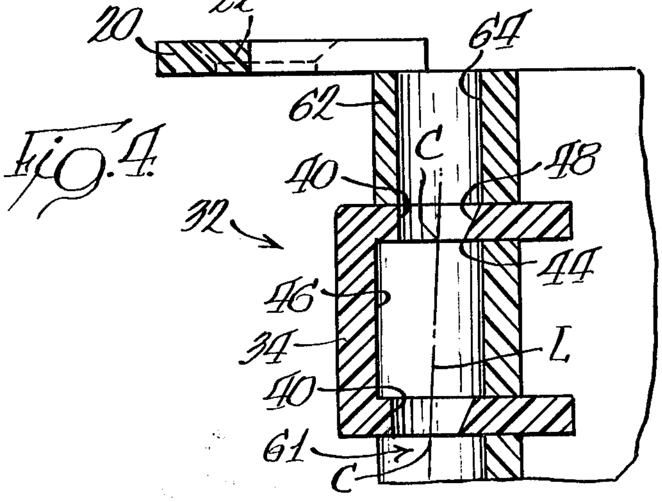
FIG. 4 is an enlarged fragmentary sectional view as viewed generally along line 4—4 of FIG. 1.

After retaining clip 32 has been inserted to the position illustrated in FIGS. 4 and 5, a threaded fastener can be inserted through aperture 64 and aperture 64 guides the fastener into the respective openings 40 in the respective legs 36 of clip 32. Since inclined surfaces 48 are directed towards embossment 64, these surfaces will act as guide surfaces and cooperate with the thread so that normal thumb pressure will cause the threads to slide along the inclined surfaces or ramps 48.

Figure 6:
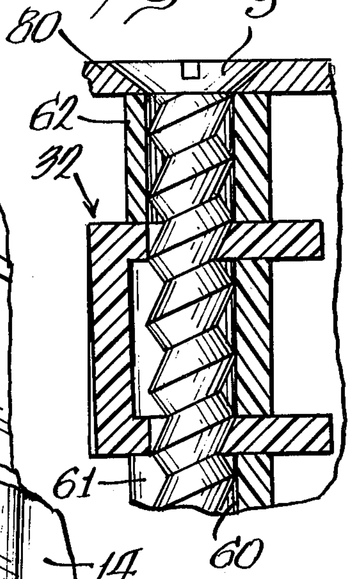
FIG. 6 is a view similar to FIG. 4, showing a screw mounted in the retaining clip.

This thumb pressure is sufficient to allow the threaded fastener to be inserted axially into passage 60 until the screw head bottoms out on the upper surface of a strap 80 (FIG. 6) forming part of a component received into space 16. If desired, the installer may then apply additional torsional forces using a conventional screwdriver which will cause the gap between the respective edges 44 of projections 42 to decrease slightly and this will produce a resultant force on the clip 32 to tend to align the respective centers C with the axis of the passage 60. The particular configuration of the projections 42 will cause the edges 44 of the respective projections to ultimately be located in engagement with the base of the thread at axially spaced locations and, because of the particular configuration, the projection will tend to jam against the thread root when a longitudinal withdrawl force is applied to the screw. When the screw is subjected to a pull out force a torque couple is created about the screw by the retaining clip which increases the resistance to removal. The torque couple causes the retaining clip to intensify the locking force into the roots of the screw thread. At anytime it is necessary for the installer to remove the threaded fastener, which is utilized for supporting a switch or an electrical outlet receptacle (not shown), the threaded fastener can readily be removed utilizing a conventional screwdriver and can again be reinserted.

The use of the simplified retaining clip for mounting a threaded fastener has significant advantages over prior art metallic type fasteners. One of the significant advantages is that the device can be molded from a plastic material, such as Nylon, in a single step mold and can easily be assembled with the receptacle box.

The components are of such a nature that the threaded fastener can readily be removed therefrom using the conventional screwdriver and can again be reused. Furthermore, in the event that the clip 32 becomes damaged for any reason, the piece can readily be removed from an outlet box and be replaced with a new clip so that the service life of the more expensive receptacle is increased.

What is claimed is:

1. An outlet box having a plurality of substantially linear walls defining a receptacle space with at least one wall having mounting means for supporting a screw having a peripheral thread, said one wall having an elongated passage for receiving said screw and a pair of axially spaced slots extending transversely of said elongated passage, retaining means including at least two retaining elements in the respective slots, each retaining element having an opening substantially equal to a major diameter of said thread with at least one of said openings having its center axially offset from the axis of said elongated passage so that an axis through the centers of said openings is angularly related to the axis for said elongated passage, and at least one flexible projection extending from the periphery of each opening towards the center and adapted to engage an inclined surface of said thread to retain said screw in said elongated passage.

2. An outlet box as defined in claim 1 in which said retaining means is a generally U-shaped non-metallic clip having a pair of generally parallel legs defining said retaining elements.

3. An outlet box as defined in claim 2, in which each projection is generally arcuate in plan and has a radial dimension substantially equal to one-half the difference between said major diameter and a root diameter for said thread.

4. An outlet box as described in claim 3, in which said one wall has a generally semicircular recess extending from a surface thereof and defining said elongated passage and an integral embossment at one end of said passage, said embossment having an aperture for guiding said screw toward said openings.

5. An outlet box as defined in claim 4, in which each projection has an inclined camming surface directed toward said embossment.

6. An outlet box as defined in claim 2, in which a base portion of said U-shaped non-metallic clip engages one surface of said one wall and each leg has an integral ledge engaging an opposite surface of said one wall to releasably retain said clip on said wall.

7. An outlet box as defined in claim 3, in which each leg has a pair of cutouts extending from said openings on opposite sides of said projections.

8. An outlet box having a plurality of walls defining a space, said outlet box having mounting means for supporting a threaded screw on at least one wall, said one wall having an elongated screw receiving passage with axially spaced slots in said one wall extending across said elongated passage, retaining means including at least a pair of screw retaining elements releasably retained in said slots and extending across said elongated passage, each retaining element having an opening therein generally equal to a major diameter of the thread on said screw, each retaining element having a projection extending from a wall of said opening with each projection having a radial dimension of approximately one-half the difference of said major diameter and a root diameter for said thread, said projections extending generally transversely of said elongated passage and adapted to engage a surface of said thread to retain said screw in said elongated passage.

9. An outlet box as defined in claim 8, in which said retaining means is a generally U-shaped member with a pair of legs of said U-shaped member defining said retaining elements.

10. An outlet box as defined in claim 9, in which at least one of said openings has its center transversely offset from the axis of said passage and said projections are deflectable towards each other.

11. An outlet box as defined in claim 10, in which each projection has an inclined camming surface facing towards an open end of said elongated passage through which said screw is received.

12. An outlet box as defined in claim 11, in which said one wall has an arcuate recess extending from a surface thereof, said arcuate recess being generally semicircular in cross-section and defining said elongated passage.

13. An outlet box as defined in claim 12, further including an integral embossment forming part of said one wall at one end of said elongated passage, said embossment having an aperture axially aligned with the axis of said passage for guiding said screw toward said openings.

14. An outlet box having a pair of end walls and a pair of side walls defining an open space closed by a bottom wall, each end wall having an arcuate recess extending from an outer surface thereof and defining an elongated passage having an axis extending generally parallel to said surface, each end wall having an integral enlargement adjacent the free edge thereof which has an aperture generally aligned with said axis, each end wall having a pair of slots extending therethrough and intersecting said passage at axially spaced locations, and a generally U-shaped retaining clip for each end wall for releasably retaining a screw having a peripheral thread in each passage, each clip having a pair of generally parallel legs extending from a bite portion and received into said pair of slots, each leg having an opening having a diameter substantially equal to a major diameter for said thread with an opening in one leg having its center generally aligned with the axis of a passage and the opening in the other leg having its center offset from said axis and each leg having a radial projection extending from the periphery of the opening toward the center thereof and adapted to engage a surface of said thread.

15. An outlet box as defined in claim 14, in which each projection has an arcuate inner edge having a radius of approximately one-half of a root diameter for said thread and having an inclined surface extending from said edge toward the free edge of said end wall.

16. An outlet box as defined in claim 15, in which each leg has integral inclined ramps terminating in ledges extending generally parallel to said axis of an associated passage with said bite portion engaging said outer surface and said ledges engaging an inner surface of an end wall to secure said clip to said end wall.

17. Mounting means for a threaded screw having a major thread diameter and a root thread diameter comprising a screw mounting member having an elongated screw receiving passage with a pair of axially spaced slots extending transversely of said passage, a non-metallic U-shaped clip having a pair of spaced legs received into said slots with each leg having a generally circular opening therein with the center of at least one opening being transversely offset from an axis for said elongated passage, each leg having a projection extending generally radially from the periphery of an associated opening toward the center thereof for engaging a surface of said thread to releasably retain said threaded screw in said passage.

18. Mounting means as defined in claim 17, in which each opening has a diameter substantially equal to said major thread diameter and each projection has an inner arcuate surface having a radius equal to substantially one-half said root thread diameter.

19. Mounting means as defined in claim 19, in which said clip has releasable integral lock means for retaining said legs in said slots.

20. A non-metallic mounting clip for use in attaching a threaded screw having a major thread diameter and a minor thread diameter to a wall, said clip being generally U-shaped and having a bite portion and a pair of generally parallel legs extending from an inner surface of said bite portion, each leg having a substantially circular opening spaced from said inner surface with the spacing of the center of one opening being greater than the spacing of the center of the other opening, each opening having an integral projection extending from the periphery thereof toward said bite portion and having an arcuate inner edge having a radius of approximately one-half said minor thread diameter, each projection having an inclined surface extending from said edge toward the periphery of said opening and each opening having a diameter substantially equal to one-half said major thread diameter.

21. A non-metallic clip as defined in claim 20, which each leg has a pair of cutouts respectively extending from the periphery of the openings on opposite ends of the projections.

22. A non-metallic clip as defined in claim 21, in which each leg has a pair of integral members located on opposite sides of the opening, each member defining an inclined surface terminating in a ledge extending generally parallel to said inner surface.

* * * * *